T. H. KERR.
CONTROLLING ELECTRIC GENERATOR PRIME MOVERS.
APPLICATION FILED OCT. 11, 1913.
1,165,418.
Patented Dec. 28, 1915.
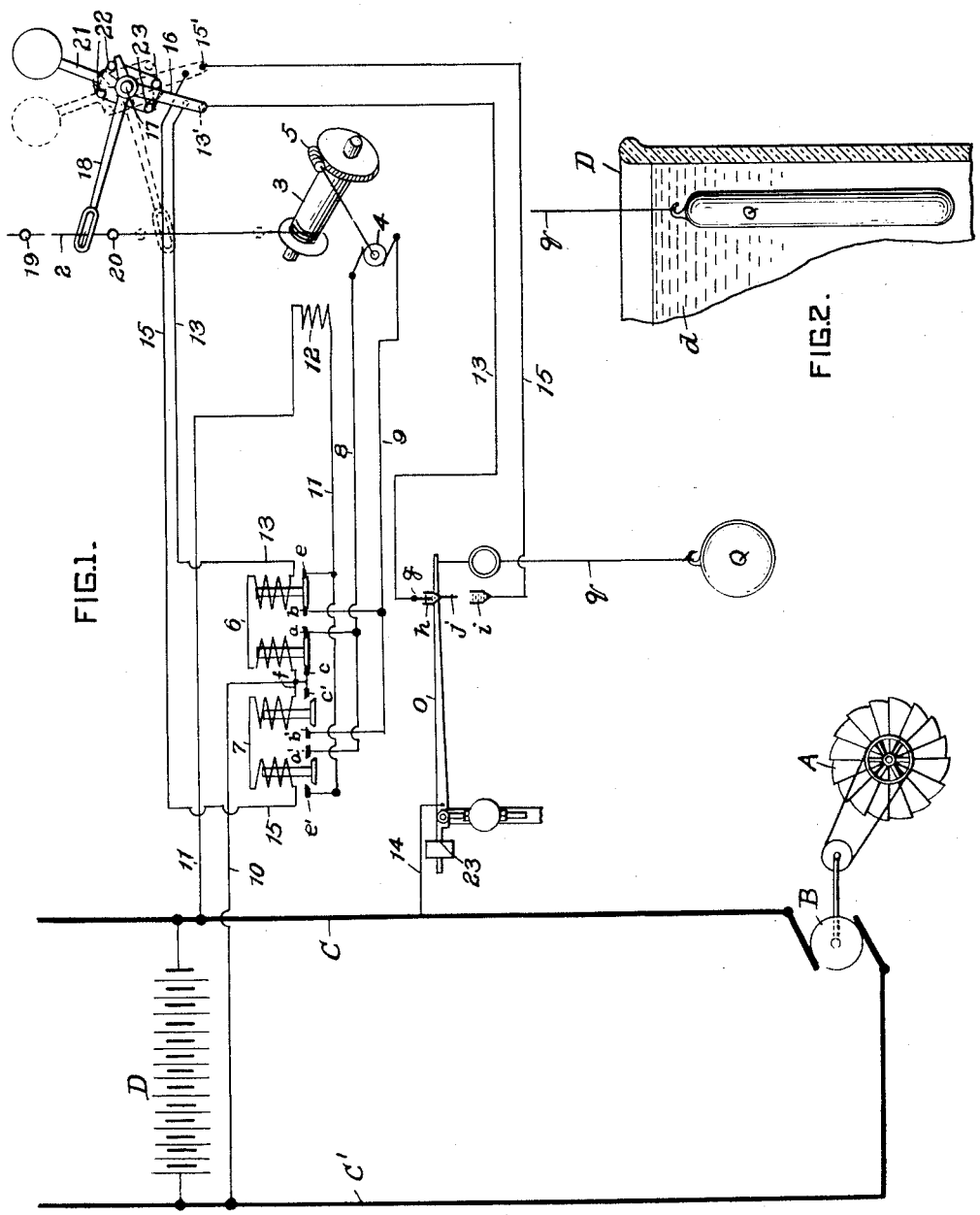

UNITED STATES PATENT OFFICE.

THOMAS H. KERR, OF PITTSBURGH, PENNSYLVANIA, ASSIGNOR TO WILLIAM SNEE AND JOHN A. SNEE, JR., OF WEST ELIZABETH, PENNSYLVANIA.

CONTROLLING ELECTRIC-GENERATOR PRIME MOVERS.

1,165,418.  Specification of Letters Patent.  Patented Dec. 28, 1915.

Application filed October 11, 1913. Serial No. 794,694.

*To all whom it may concern:*

Be it known that I, THOMAS H. KERR, a citizen of the United States, and resident of Pittsburgh, in the county of Allegheny and State of Pennsylvania, have invented certain new and useful Improvements in Controlling Electric - Generator Prime Movers, of which the following is a specification.

This invention relates to the charging of storage batteries, and the primary object is to utilize the state of charge of the battery for controlling the operation of a motor which drives the battery charging generator, whereby when the battery has become depleted the motor will be started, and when fully charged the motor will be stopped.

The invention is designed with special reference to automatically controlling the power-developing periods of a wind wheel, with means actuated by variations in the battery charge for throwing the wheel in and out of the wind.

In the accompanying drawings, Figure 1 is a diagrammatic view of an adaptation of the invention for controlling a wind wheel. Fig. 2 is a detail of a portion of the storage battery.

Referring to the drawings, A designates a wind wheel which may be geared in any suitable manner to an electric generator B. C, C' are the leads of the generator circuit in which the storage battery D is arranged in parallel.

It is usual in wind wheel practice to throw the wheel in and out of the wind by a rod or cable on which a downward pull is exerted for turning the wheel out of the wind, and which is released and permitted to move upwardly to turn the wheel into the wind. These operations are so well understood in the art that it is believed unnecessary to illustrate the wind wheel mechanism which makes effective the operations of the controlling rod or cable. Such a cable is indicated at 2 in the diagram, and its vertical movement is controlled by drum 3 on which it winds. This drum may be driven by motor 4 through the medium of worm gearing 5, whereby the drum is secured against rotation when the motor is at rest.

Two circuits are provided for passing current from the battery (or generator circuit) to motor 4, the arrangement of the two circuits being such that they direct the flow through the motor armature in reverse directions. And as provision is had for directing the current through the motor field in the same direction, regardless of the direction of flow through the armature, the motor may be driven in reverse directions, depending on whether cable 2 is to be wound on the drum or permitted to unwind therefrom.

The motor circuits are under the control, respectively, of two controlling circuits, and in the adaptation here shown one of the latter is adapted to be closed when the battery is fully charged and thereby energize the circuit which operates to drive the motor for winding cable 2 on the drum 3 and pulling the wheel out of the wind. The other controlling circuit is adapted to be closed at any desired state of depletion of the battery, thereby energizing the other motor circuit and causing the motor to operate in a direction that will permit cable 2 to unwind and allow the wheel to turn into the wind.

I will first describe the motor and controlling circuits and follow this with a description of the mechanism actuated by the state of charge of the battery for closing the controlling circuits.

Two double relays 6 and 7 coöperate with the two motor circuits as well as the two controlling circuits, with leads 8 and 9 of the motor armature each adapted to connect with both relays, lead 8 connecting with relay 6 through contact *a* and with relay 7 through contact *a'*, and lead 9 connecting with relay 6 through contact *b* and with relay 7 through contact *b'*. Lead 10 from the battery (or generator circuit) is provided with the double contact *c* and *c'*, the former adapted to connect with relay 6, and contact *c'* with relay 7. The other battery (or generator circuit) lead 11 includes the motor field winding 12 and is adapted to connect with relay 6 through contact *e* and with relay 7 through contact *e'*. The windings of relays 6 and 7 are, respectively, in series with the two controlling circuits, battery lead 10 being common to the two circuits at junction *f*. One of these circuits from junction *f* is through the windings of relay 6 and then through wire 13 to a contact *g*, the latter adapted to be embraced by the mercury cup H on the vertically swinging lever arm O, the latter connected at 14 with lead C of the generator and battery circuit. The other controlling circuit extends from junction $f$ through the windings of relay 7 and then through wire 15 to the mercury cup contact $i$ into which is adapted to enter contact $j$ carried by arm O when in lowered position and completing the circuit through connection 14 to the generator circuit or battery.

The diagram illustrates the circuits established by the meeting of contacts $g$—$h$ which effects the closing of controlling circuit 13, thereby operating motor 4 in a direction to wind cable 2 on drum 3 for pulling the wheel out of the wind. The operation in this regard is as follows: With controlling circuit 13 closed as indicated in the diagram, the current flow in said circuit is through lead 10, the windings of relay 6, through wire 13, contacts $g$ and $h$ and arm O, and connection 14 to the generator circuit. Relay 6 being thus energized its armatures are raised and one connects contacts $a$ and $c$, and the other armature connects contacts $b$ and $e$, thereby establishing a path for one of the motor circuits, as follows: from lead 10 through contacts $c$ and $a$ to motor lead 8, through the motor and through lead 9, through contacts $b$ and $e$, and through the motor field 12 and lead 11 to the source of current. This operation results in rotating drum 3 in a direction to wind cable 2 and to pull the wheel out of the wind.

With controlling circuit 15 closed through contacts $i$—$j$, as above described, the energizing of the windings of relay 7 raises the armatures of the latter, whereupon the other motor circuit is completed as follows: through lead 10 contacts $c$ and $b$, motor lead 9, through the motor armature and through armature lead 8, through contacts $a'$ and $e'$ and through wire 11 to the motor field winding 12, and thence back to the source of flow. From the foregoing description it will be noted that the current flow through the motor armature is in reverse directions for the two motor circuits, whereas the direction of flow through the motor field is always the same, thereby insuring the desired reversal in the direction of rotation of the motor armature.

In order to stop the motor after it has run sufficiently to throw the wheel in or out of the wind, circuits 13 and 15 are formed with gaps 13′ and 15′, respectively, and common thereto is the circuit closer or switch 16 pivoted at 17 concentrically with arm 18 and with the upright counterweighted arm 21. Stops 22 on arm 21 coöperate with arm 18, and similar stops 23 on arm 21 coöperate with switch 16. In the drawing arm 18 is shown in raised position, but when depressed it turns arm 21 until the latter passes vertical position whereupon it drops quickly to the dotted line position and the left-hand stop 23 throws the switch suddenly from circuit gap 13′ to gap 15′. Arm 18 is apertured to pass cable 2, and said arm is raised and lowered by stops 19 and 20 on the cable. Thus, with circuit 13 closed through switch 16 as shown in the diagram, the motor is energized, as above described, for so rotating drum 3 as to wind cable 2 thereon. When this winding has continued sufficiently to pull the wheel out of the wind, stop 19 engages arm 18 and so depresses the latter as to throw counterweighted lever 21, and thereby suddenly throw switch 16, as above described, opening circuit 13 and deenergizing relay 6, thereby opening the motor circuit controlled by said relay and stopping motor 4.

With the controlling circuit 15 and motor circuit 9 energized as above described, the rotation of motor 4 is such as to permit cable 2 to unwind sufficiently to release the wheel to the wind, and when this has been accomplished the cable stop 20 lifts arm 18 and shifts switch 16 to circuit 13, thereby bringing the motor to a standstill.

The state of charge of battery D may be variously utilized for closing controlling circuits 13, 15, respectively, together with the appropriate motor circuit 8 or 9. In the present adaptation, swinging arm O is actuated by a hydrometer Q suspended from the arm by wire $q$ in the liquid element $d$ of battery D. It is well known that the specific gravity of the battery liquid varies with the state of charge, being higher when the battery is charged than when depleted. Arm O may be balanced between its counterweight 23 and the hydrometer at a given state of charge of the battery. If the charge increases above such predetermined point, the increased buoyancy of the hydrometer, corresponding to the increased gravity of the liquid, will permit arm O to rise sufficiently to close the controlling circuit between contacts $g$ and $h$, thereby energizing motor 4, as above described, and causing it to wind cable 2 and pull the wheel out of the wind, thereby stopping generator A. When the battery has been depleted to a point where it is desired to resume generation, the increased pull of the hydrometer due to decrease in the specific gravity of liquid $d$ lowers the arm until operating circuit 15 is closed through contacts $i$—$j$, thereby energizing the motor in the manner above described in a direction that causes it to unwind cable 2 from drum 3, thereby permitting the wheel to turn into the wind and actuate the generator.

While part Q is referred to herein and in the claims as a hydrometer, it will be understood that by said term I include any object of greater specific gravity than the battery liquid with variations in its buoyancy constituting a measure of the relative specific gravity of the liquid.

While the invention is designed with special reference to controlling the power generating periods of a wind wheel, it may be variously utilized for causing the state of charge of the battery to control other prime movers without departing from the invention.

I claim:

1. The combination of a storage battery, an electric generator for charging the same, a wind wheel for driving the generator, an electric motor, means actuated by the motor when operating in one direction for turning the wheel into the wind and when the motor is operating in a reverse direction for turning the wheel out of the wind, two electric circuits extending from the battery to the motor and when closed adapted, respectively, to cause the motor to operate in reverse directions, a movable circuit breaker adapted in different positions thereof to close the respective motor circuits, and means actuated by the state of charge of the battery for determining the position of the circuit-breaker.

2. The combination of a storage battery, an electric generator for charging the same, a wind wheel for driving the generator, an electric motor, means actuated by the motor when operating in one direction for turning the wheel into the wind and when the motor is operating in a reverse direction for turning the wheel out of the wind, two electric circuits extending from the battery to the motor and when closed adapted, respectively, to cause the motor to operate in reverse directions, two controlling circuits connected to the battery—one for each of the motor circuits, a switch common to the controlling circuits, means actuated by the state of charge of the battery for determining the position of the switch, and relays in the controlling circuits adapted when energized to close the respective motor circuits.

3. The combination of a storage battery, an electric generator for charging the same, a wind wheel for driving the generator, an electric motor, means actuated by the motor when operating in one direction for turning the wheel into the wind and when the motor is operating in a reverse direction for turning the wheel out of the wind, two electric circuits extending from the battery to the motor and when closed adapted, respectively, to cause the motor to operate in reverse directions, two controlling circuits connected to the battery—one for each of the motor circuits, a switch common to the controlling circuits, means actuated by the state of charge of the battery for determining the position of the switch, relays in the controlling circuits adapted when energized to close the respective motor circuits, switch means common to the controlling circuits, and means actuated by the wind-wheel turning mechanism at the completion of each movement thereof to close one of the controlling circuits and open the other controlling circuit.

4. The combination of a storage battery, a generator for charging the same, a wind wheel for driving the generator, a cable movable in opposite directions for turning the wheel into and out of the wind, a drum for winding and unwinding the cable, a reversible electric motor for driving the drum to wind and unwind the cable, two motor circuits extending from the battery and when closed adapted, respectively, to drive the motor in reverse directions, a switch common to the motor circuits and adapted in different positions thereof to close the respective circuits, and means actuated by the state of charge of the battery for determining the position of said switch.

In testimony whereof I affix my signature in presence of two witnesses.

THOMAS H. KERR.

Witnesses:
J. M. NESBIT,
F. E. GAITHER.